(12) United States Patent
Sheu

(10) Patent No.: US 8,397,374 B2
(45) Date of Patent: Mar. 19, 2013

(54) MICRO SPHERICAL STYLUS MANUFACTURING MACHINE

(75) Inventor: Dong-Yea Sheu, Taipei (TW)

(73) Assignee: National Taipei University of Technology (TW)

( * ) Notice: Subject to any disclaimer, the term of this patent is extended or adjusted under 35 U.S.C. 154(b) by 915 days.

(21) Appl. No.: 12/503,953

(22) Filed: Jul. 16, 2009

(65) Prior Publication Data

US 2011/0010931 A1    Jan. 20, 2011

(51) Int. Cl.
*B23H 1/04*    (2006.01)
*B23H 9/00*    (2006.01)

(52) U.S. Cl. .......... 29/700; 219/69.12

(58) Field of Classification Search .......... 29/700; 219/69.12, 69.11
See application file for complete search history.

(56) References Cited

U.S. PATENT DOCUMENTS 4,634,826 A * 1/1987 Solomon et al. .......... 219/69.17
5,681,638 A * 10/1997 Korenaga .......... 428/119

FOREIGN PATENT DOCUMENTS

JP    10175123 A  *  6/1998

OTHER PUBLICATIONS

JP10175123A Machine Translation, obtained Sep. 2, 2012.*

* cited by examiner

*Primary Examiner* — Livius R Cazan
(74) *Attorney, Agent, or Firm* — Schmeiser, Olsen & Watts, LLP

(57) ABSTRACT

A micro spherical stylus manufacturing machine comprises a clamp, a moving unit, a wire supply unit, a wire retrieving unit, an insulating roller, a conducting wire body, a discharging unit, and a loading unit. The clamp is used to hold a circular-shaped electrode, and the loading unit is used to carry a micro sphere, and the insulating roller is positioned at one side of the clamp. The micro spherical stylus manufacturing machine can fabricate a micro electrode tool on the same platform, and then form a micro spherical stylus for a micro coordinate measuring machine by a gluing process.

12 Claims, 8 Drawing Sheets

MICRO SPHERICAL STYLUS MANUFACTURING MACHINE

FIELD OF THE INVENTION

The present invention relates to a micro spherical stylus manufacturing machine, in particular to a micro spherical stylus for a micro coordinate measuring machine formed by a gluing process after a micro electrode tool is formed on a same machine platform.

BACKGROUND OF THE INVENTION

In a general mechanical manufacturing area such as a micro electro discharge manufacturing (micro EDM) area, it is necessary to use a wire electro discharge grounding (WEDG) technique and a numerical control (NC) program to manufacture the micro spherical electrode tool.

The micro spherical stylus for EDM process comprises two portions, one is a circular-shaped electrode and the other portion is a micro sphere. In general, the micro spherical stylus is made by machining the surface contour of a metal rod to form the circular-shaped electrode and the micro sphere. When the EDM machine and NC program are utilized to manufacture the micro spherical stylus, the obvious electro discharge craters will be left on the surface of the micro sphere after the micro spherical stylus is formed. Further, since this conventional micro-tool fabrication shapes the surface contour of the circular-shaped electrode and the micro sphere. When the diameter of the micro sphere is less than 0.1 mm, the manufacture of the micro spherical stylus will involve a high level of challenge and difficulty. Particularly, the electro discharge craters will affect the measuring accuracy of the micro coordinate measuring machine, and thus this conventional method is not suitable for manufacturing micro spherical styluses for micro coordinate measuring machines.

There are other conventional manufacturing methods to fabricate the micro spherical stylus such as, melting a front end of a glass fiber thread (having a diameter of 0.125 mm) by using a hot melting method to form a small spherical optical glass fiber stylus, but the spherical stylus formed by the hot melting method usually has a diameter much greater than 0.125 mm. Since the optical glass fiber comes with a soft and flexible feature, the formed stylus is bent or curled easily when the stylus is in contact with an object during the measuring process. Obviously, this method is also not suitable for manufacturing a micro sensor head of the micro coordinate measuring machine.

Although those traditional micro-EDM manufacturing machine can be used for manufacturing various types of micro rod styluses made of a hard material such as, a super hard alloy tungsten carbide (WC) or a pure tungsten material, yet the manufacture of micro spherical styluses for micro coordinate measuring machines cannot be achieved due to the traditional methods cannot fabricate smaller diameter of micro spherical stylus. Further, if the required micro electrode tool is manufactured by modifying the circular rod material having a larger diameter ($\psi$ over 0.5 mm), the manufacturing time will be extended tremendously.

Another traditional method is to use a micro electrode tool that is currently available in the market to manufacture the micro spherical stylus. Once a correct size of micro electrode tool is selected, a micro sphere (such as a micro metal sphere or a micro glass sphere) is then adhered to a front end of the tool to form the micro spherical stylus. The fabrication process of this method involves two separated steps, first, selecting the right size of micro electrode tool to be used, and then adhering the clamped micro sphere to the front end of the micro electrode tool to form the micro spherical stylus. Since the issue of clamping the micro sphere by a clamp can cause a deviation of the micro spherical stylus easily, therefore the micro sphere is deviated from the axis of the tool. Furthermore, the electrode tool may be bent or broken easily during the clamping and gluing processes when the diameter of the electrode tool is smaller than 0.1 mm.

As described above, the micro spherical stylus tip head for micro coordinate measuring machines presently undergoes extensive researches and developments in measuring centers all over the world, and traditional machining process using the optical glass fiber hot melting method for the manufacture of micro spherical styluses still have many problems, and are not suitable for manufacturing the micro spherical styli tip of the micro coordinate measuring machines, and thus the micro coordinate measuring machine (Micro CMM) cannot be used for measuring physical dimensions and the profile of components or sub-micron components of the micro semiconductor fabrication process due to the size limitation of the micro sensor head.

It is a major subject of the invention to develop a micro spherical stylus manufacturing machine for forming a micro electrode tool on the same machine platform, and then forming a micro spherical stylus for the micro coordinate measuring machine by a gluing process.

SUMMARY OF THE INVENTION

In view of the aforementioned shortcomings of the conventional manufacturing machine, the inventor of the present invention based on years of experience in the related industry to conduct extensive researches and experiments, and finally developed a micro spherical stylus manufacturing machine to achieve the effect of forming a micro spherical stylus for a micro coordinate measuring machine on a same machine platform.

Therefore, it is a primary objective of the present invention to provide a micro spherical stylus manufacturing machine having a loading unit installed on a multi-step dual-winding micro electrode tool manufacturing machine, such that a micro sphere can be combined with a micro electrode tool to achieve the effect of forming a micro spherical stylus for a micro coordinate measuring machine on the same machine platform by a gluing process.

To achieve the foregoing objective, the present invention provides a micro spherical stylus manufacturing machine comprising: a clamp having a moving unit, installed at the micro spherical stylus manufacturing machine and capable of moving vertically up and down; a wire supply unit, pivotally installed at the manufacturing machine; a wire retrieving unit, pivotally installed at the micro spherical stylus manufacturing machine; an insulating roller, pivotally installed at the micro spherical stylus manufacturing machine and having an insulating guide trench; a conducting wire body, wound around the wire supply unit, and slid through the insulating guide trench, and then wound around the wire retrieving unit; a discharging unit, electrically coupled to the conducting wire body; and a loading unit, installed at the manufacturing machine and capable of moving along a plane of the manufacturing machine, and the loading unit having a carrying opening, an air passage and an air flow guide unit, and the air passage being interconnected with the carrying opening and the air flow guide unit.

The wire supply unit comprises an upper wire supply unit and a lower wire supply unit, and the wire retrieving unit comprises an upper wire retrieving unit and a lower wire retrieving unit, and the insulating roller is a multi-step insulating roller, and the insulating roller includes an upper insulating guide plate and a lower insulating guide plate, and the upper insulating guide plate and the lower insulating guide plate constitute a multi-step form with each other when they are assembled together, and the upper insulating guide plate is situated at a position away from the clamp, and the lower insulating guide plate is situated at a position proximate to the clamp. The conducting wire body comprises an upper conducting wire body and a lower conducting wire body, and the upper conducting wire body is wound around the upper wire supply unit and slid through the upper insulating guide plate and then wound around the upper wire retrieving unit, and the lower conducting wire body is wound around the lower wire supply unit, and slid through the lower insulating guide slot, and then wound around the lower wire retrieving unit, and the discharging unit includes a transistor resistor capacitor discharging unit and a resistor capacitor discharging unit, and the transistor resistor capacitor discharging unit is electrically coupled to the upper conducting wire body, and the resistor capacitor discharging unit is electrically coupled to the lower conducting wire body.

The micro spherical stylus manufacturing machine of the invention further comprises a front support shaft pivotally installed at the manufacturing machine and disposed between the wire supply unit and the multi-step insulating roller, and the upper conducting wire body slides from the upper wire supply unit through the front support shaft and then through the upper insulating guide slot, and the lower conducting wire body slides from the lower wire supply unit through the front support shaft and then through the lower insulating guide slot.

The micro spherical stylus manufacturing machine of the invention further comprises a rear support shaft pivotally installed at the manufacturing machine and disposed between the multi-step insulating roller and the wire retrieving unit, and the upper conducting wire body slides from the upper insulating guide plate through the rear support shaft and then through the upper wire retrieving unit, and the lower conducting wire body slides from the lower insulating guide plate through the rear support shaft and then through the lower wire retrieving unit.

The micro spherical stylus manufacturing machine of the invention can be used for forming a micro spherical stylus for a micro coordinate measuring machine on a same machine platform.

The micro spherical stylus manufacturing machine of the present invention comprises a clamp, an EDM machine and a loading unit, wherein the clamps is installed at the manufacturing machine and capable of clamping a circular-shaped electrode to move vertically up and down, the EDM machine, is installed at the manufacturing machine and capable of electro discharging machining to the circular-shaped electrode into a micro electrode tool. The loading unit is installed at the manufacturing machine, wherein the loading unit comprises a carrying opening, an air passage and an air flow guide unit, and the air passage being interconnected to the carrying opening and the air flow guide unit. A micro sphere is attached to the carrying opening of the loading unit by utilizing the air flow guide unit to vacuum out the air inside the air passage so that the micro sphere is fixedly sucked onto the carrying opening and the micro sphere is carried by the loading unit towards a front end of the micro electrode tool in such that a micro spherical stylus is generated.

DESCRIPTION OF THE PREFERRED EMBODIMENTS

Other features and advantages of the present invention will become apparent in the following detailed description of the preferred embodiments with reference to the accompanying drawings.

Figure 1:
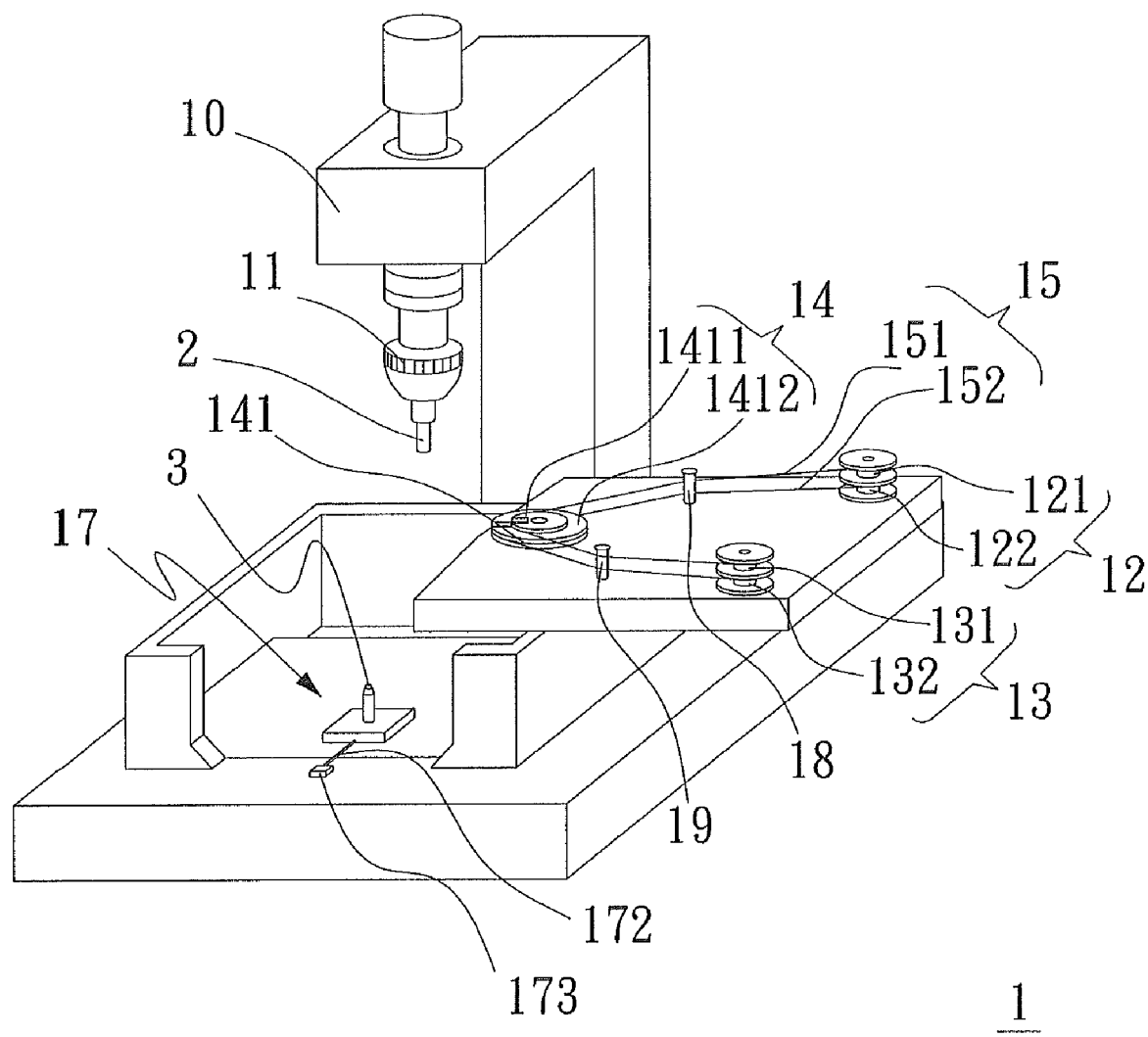
FIG. 1 is a schematic view of a preferred embodiment of the present invention.
Figure 2:
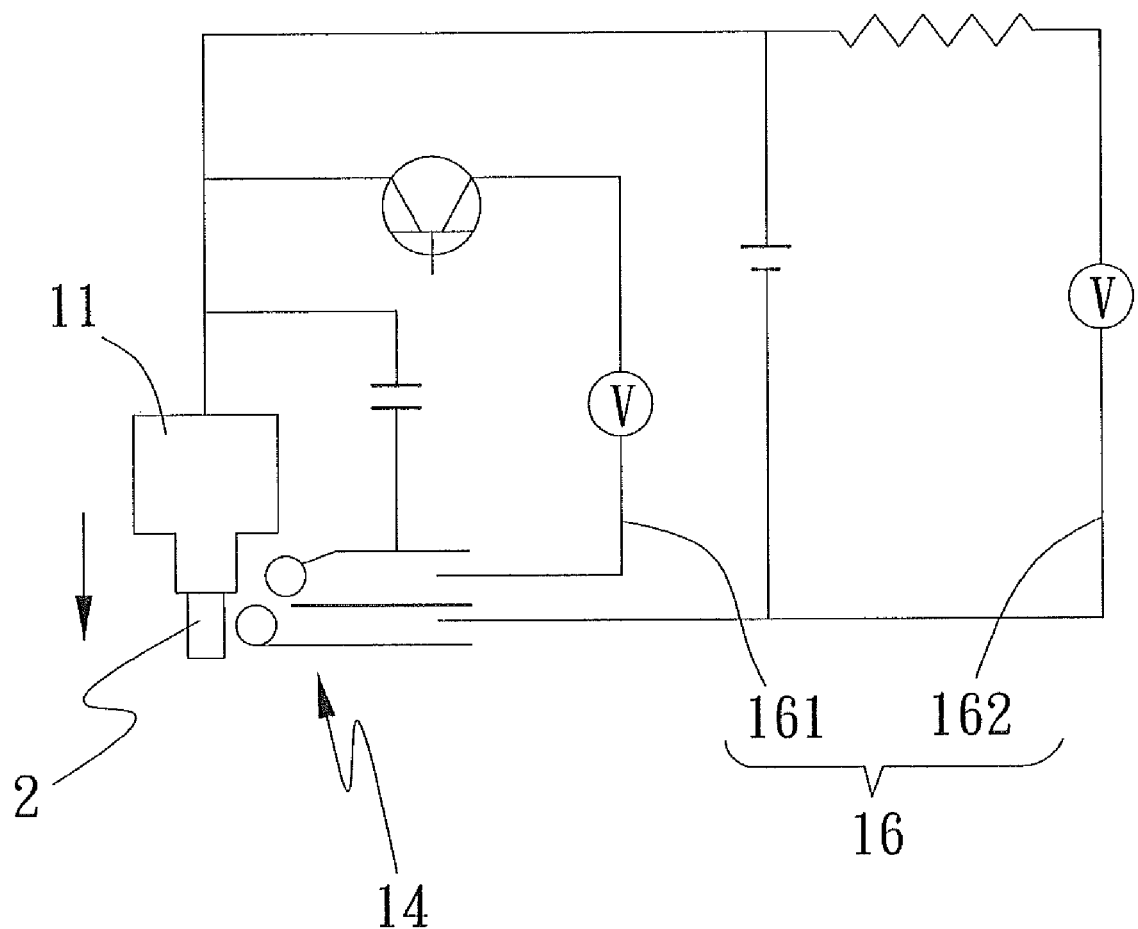
FIG. 2 is a schematic view of a discharging unit in accordance with a preferred embodiment of the present invention.

With reference to FIGS. 1 and 2 for a schematic view of a preferred embodiment of the present invention and a schematic view of a discharging unit of the invention respectively, in which the discharging unit of the present invention comprises an electro discharge manufacturing (EDM) machine 1 and a micro spherical stylus manufacturing machine. The EDM machine 1 of the present invention comprises a wire supply unit 12, a wire retrieving unit 13, an insulating unit 13, an insulting roller 14, a conducting wire body 15 and a discharging unit 16, wherein the micro spherical stylus manufacturing machine of the invention comprises a clamp 11, a moving unit 10, the wire supply unit 12, the wire retrieving unit 13, the insulating roller 14, the conducting wire body 15, the discharging unit 16 and a loading unit 17. In the following preferred embodiments, a dual wiring system is used for illustrating the present invention, but a single-wiring system can also be used with the same principle in the invention. Moreover, embodiments of the micro spherical stylus manufacturing machine 1 further comprises a front support shaft 18 pivotally installed at the manufacturing machine 1 and disposed between the wire supply unit 12 and the multi-step insulating roller 14, and a rear support shaft 19 pivotally installed at the manufacturing machine 1 and disposed between the multi-step insulating roller 14 and the wire retrieving unit 13.

Figure 6:
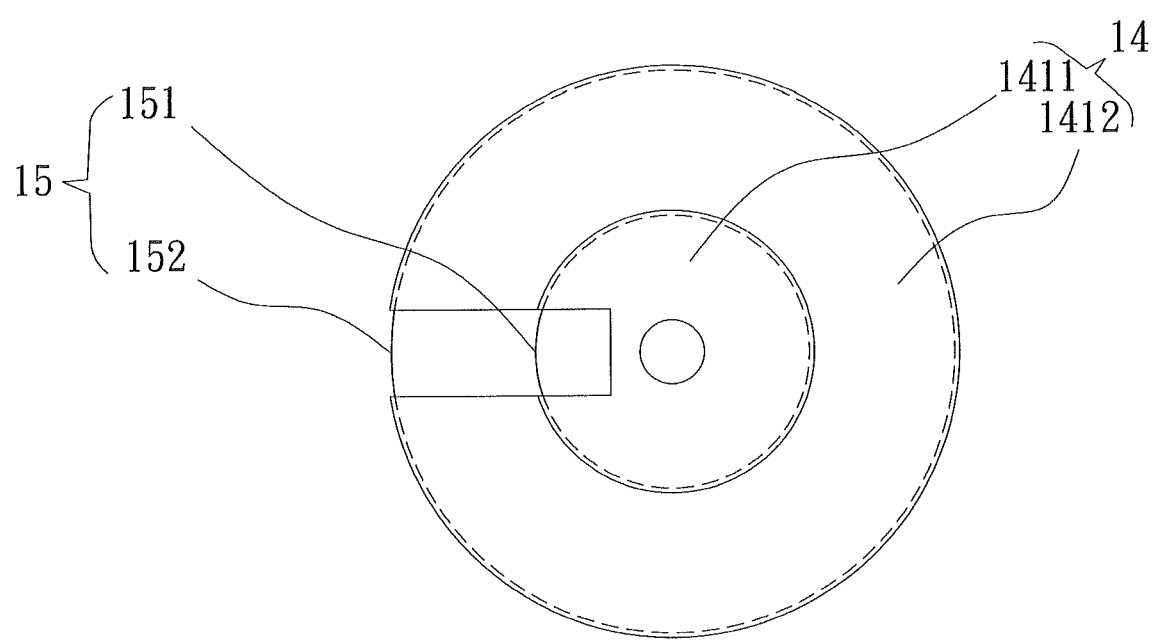
FIG. 6 is a schematic top view of a upper insulating guide plate and a lower insulating guide plate stacked together.

The clamp 11 is provided for clamping a circular-shaped electrode 2 and the moving unit 10 being coupled to the clamp 11 is capable of moving vertically up and down with respect to the manufacturing machine 1. The wire supply unit 12 is pivotally installed at the EDM machine 1 and comprises an upper wire supply unit 121 and a lower wire supply unit 122, and the upper wire supply unit 121 and the lower wire supply unit 122 can be either stacked with each other or installed with an interval apart. The wire retrieving unit 13 is pivotally installed at the EDM machine 1 and comprises an upper wire retrieving unit 131 and a lower wire retrieving unit 132, and the upper wire retrieving unit 131 and the lower wire retrieving unit 132 can be either stacked with each other or installed with an interval apart. The insulating roller 14 is pivotally installed at the EDM machine 1 and disposed on a side of the clamp 11, and the insulating roller 14 can comprise various sizes of rollers with insulating guide trenches 141 to form a multi-step insulating roller. The insulating roller 14 comprises an upper insulating guide plate 1411 and a lower insulating guide plate 1412, wherein the guide plates 1411 and 1412 in this embodiment are circular-shaped and both have guide trenches 141 formed along its circumferences as shown in FIG. 1. From a top view of the upper insulating guide plate 1411 and the lower insulating guide plate 1412, a slot is provided at one section of each insulting guide plate 1411 & 1412 as shown in FIG. 6. The upper insulating guide plate 1411 and the lower insulating guide plate 1412 are assembled together and constitute a multi-step form with each other, in such that the slots of the both guide plates 1411 & 1412 are aligned together as shown in FIG. 6. Refer to FIGS. 1 and 6, the conducting wire body 15 is wound around the guide trenches 141 of the insulting guide plate 1411 & 1412 respectively and slid across both slots of the insulting guide plate 1411 & 1412 along the guide trenches 141. The upper insulating guide plate 1411 is situated at a position away from the clamp 11, and the lower insulating guide plate 1412 is situated at a position proximate to the clamp 11, and the upper insulating guide plate 1411 and the lower insulating guide plate 1412 can be either stacked with each other or installed with an interval apart. The upper conducting wire body 151 is wound around the upper wire supply unit 121, and slid through the upper insulating guide plate 1411, and then wound around the upper wire retrieving unit 131, wherein the upper conducting wire body 151 is made of copper. The lower conducting wire body 152 is wound around the lower wire supply unit 122, and slid through the lower insulating guide plate 1412, and then wound around the lower wire retrieving unit 132, and the lower conducting wire body 152 is made of copper.

The electro discharging unit 16 comprises a transistor resistor capacitor discharging unit 161 and a resistor capacitor discharging unit 162, and the transistor resistor capacitor discharging unit 161 is electrically coupled to the upper conducting wire body 151, and the resistor capacitor discharging unit 162 is electrically coupled to the lower conducting wire body 152, and the transistor resistor capacitor discharging unit 161 is provided for a rough trim discharge manufacturing, and the resistor capacitor discharging unit 162 is provided for a fine-tune discharge manufacturing. The loading unit 17 is installed at the EDM machine 1 and moved along a plane of the EDM machine 1 via the moving unit 10, and the loading unit 17 comprises a carrying opening 171, an air passage 172 and an air flow guide unit 173, and the air passage 172 is interconnected with the carrying opening 171 and the air flow guide unit 173, and the carrying opening 171 carries a micro sphere 3, and the micro sphere 3 is capable of sealing the carrying opening 171, and the air flow guide unit 173 is provided for sucking or blowing air, and the micro sphere 3 is made of metal, glass, ceramic and silicon, etc.

Figure 3:
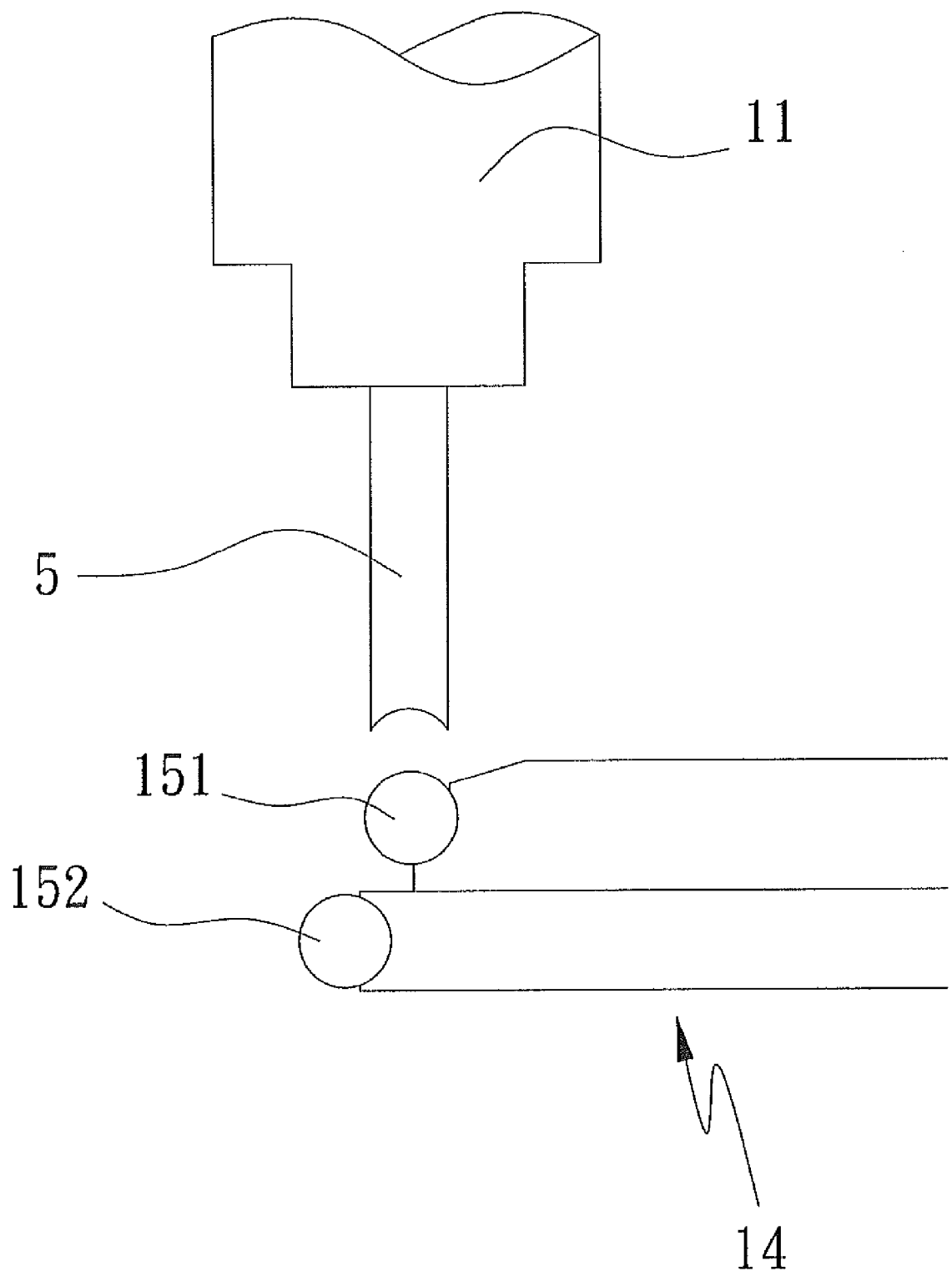
FIG. 3 is a schematic view of manufacturing of a front end of a micro electrode tool into an arc-shaped structure in accordance with a preferred embodiment of the present invention.
Figure 4A:
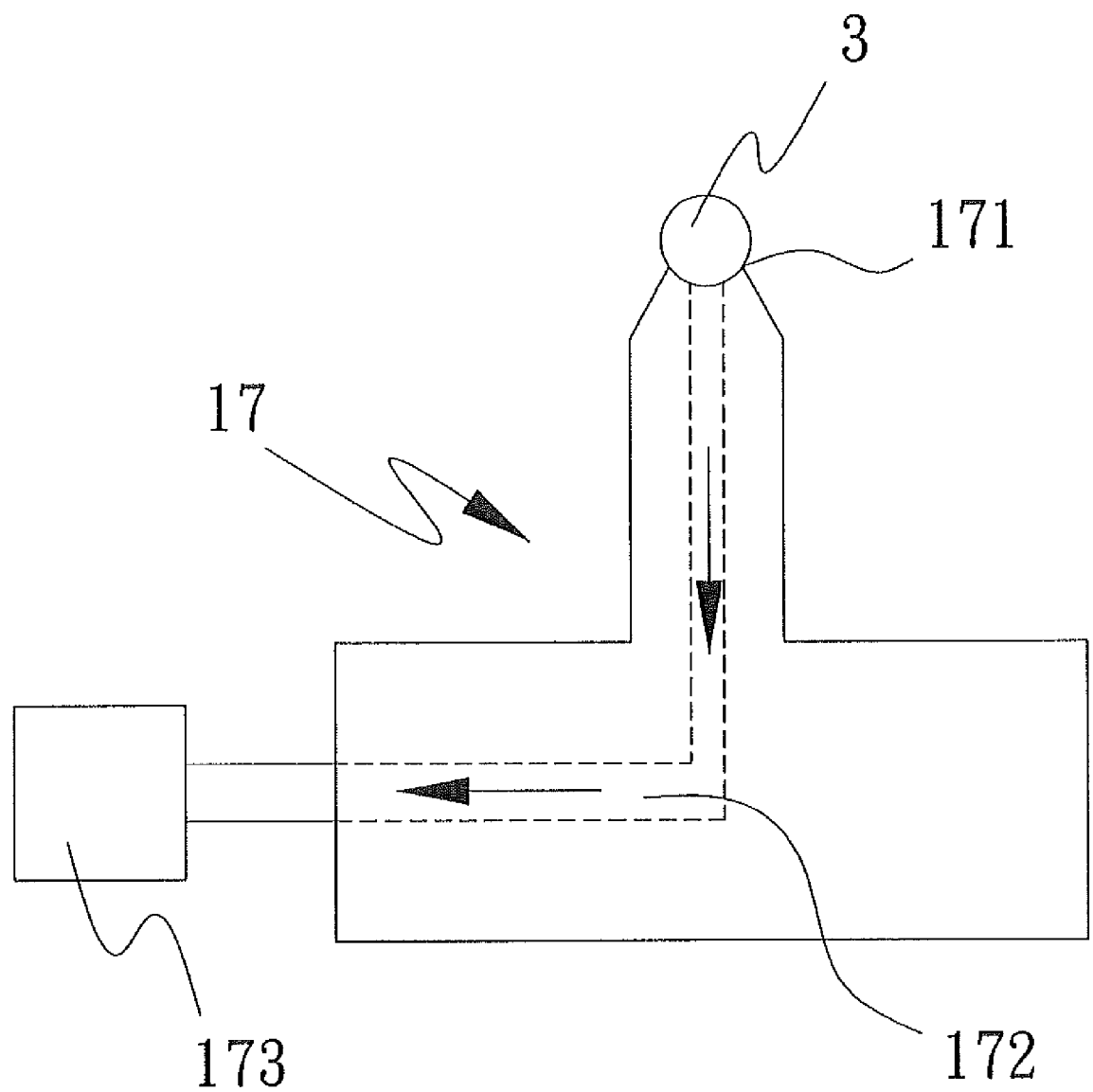
FIG. 4A is a schematic view of a micro sphere carried by an carrying opening of a loading unit in accordance with a preferred embodiment of the present invention.
Figure 4B:
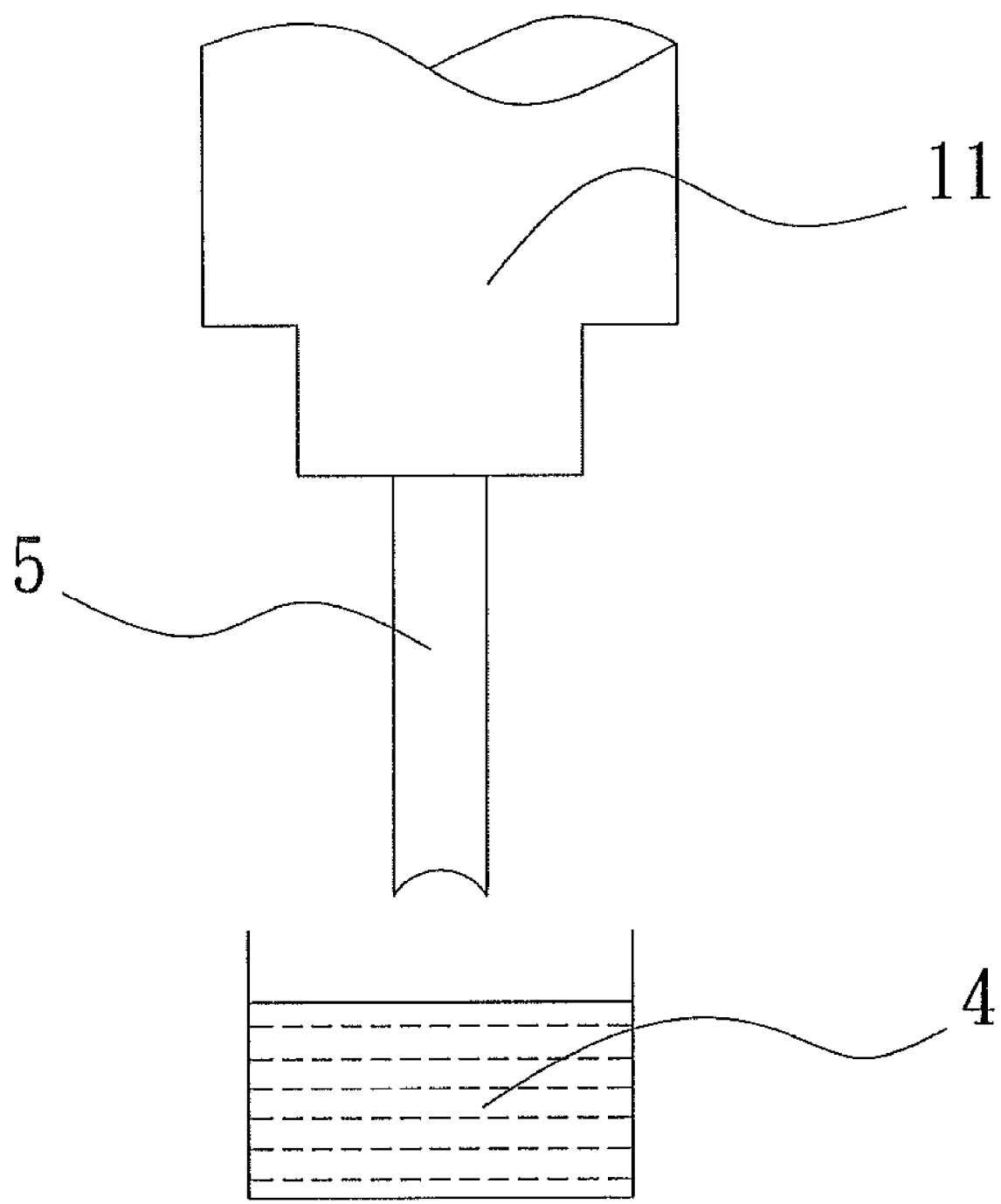
FIG. 4B is a schematic view of a circular-shaped electrode machined into a micro electrode tool with an arc-shaped front end and its front end is dipped into an adhesive container.
Figure 5A:
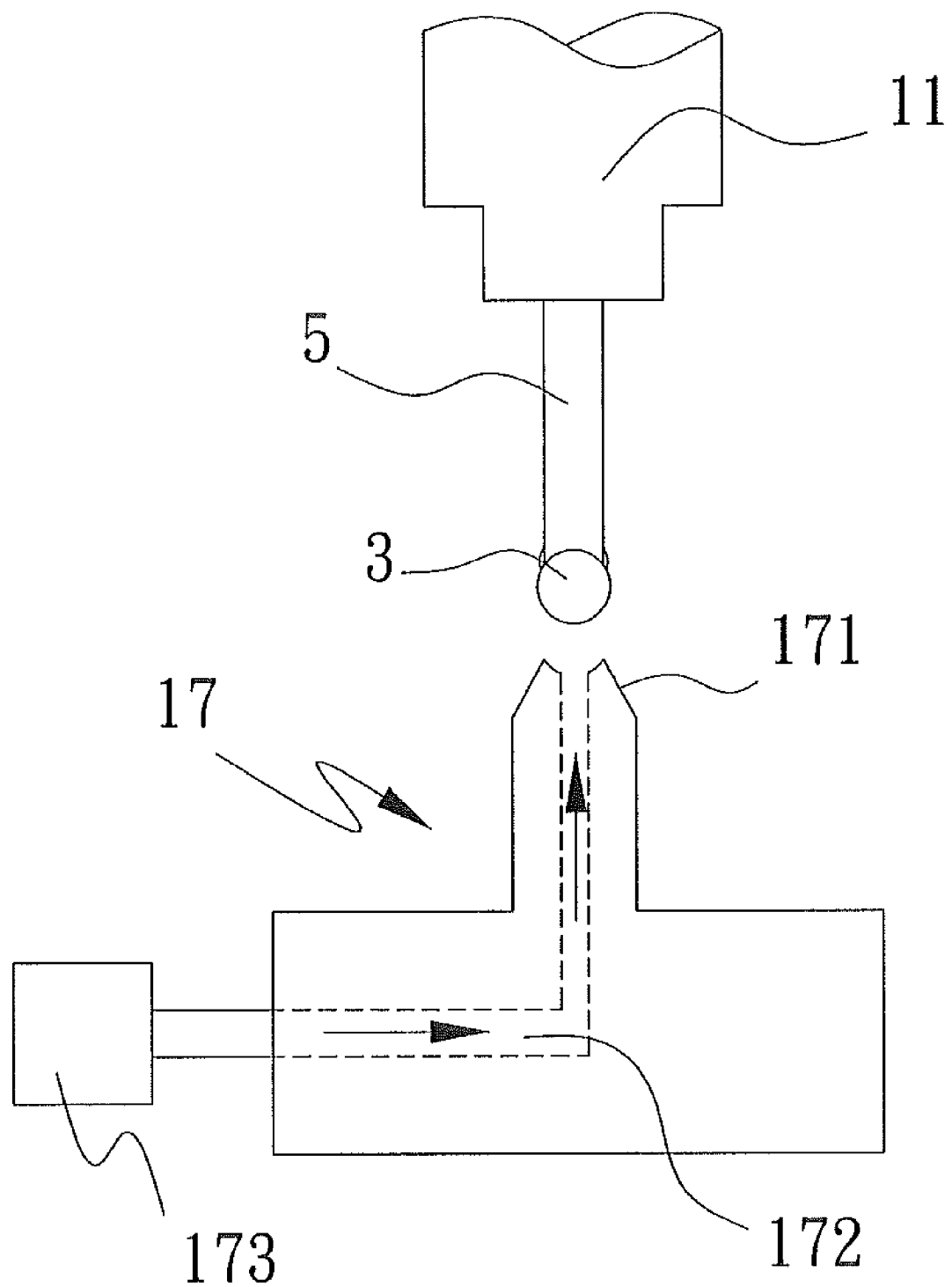
FIG. 5A is a schematic view of how the micro sphere is attached to the arc-shaped front end of the micro electrode tool in accordance with a preferred embodiment of the present invention.
Figure 5B:
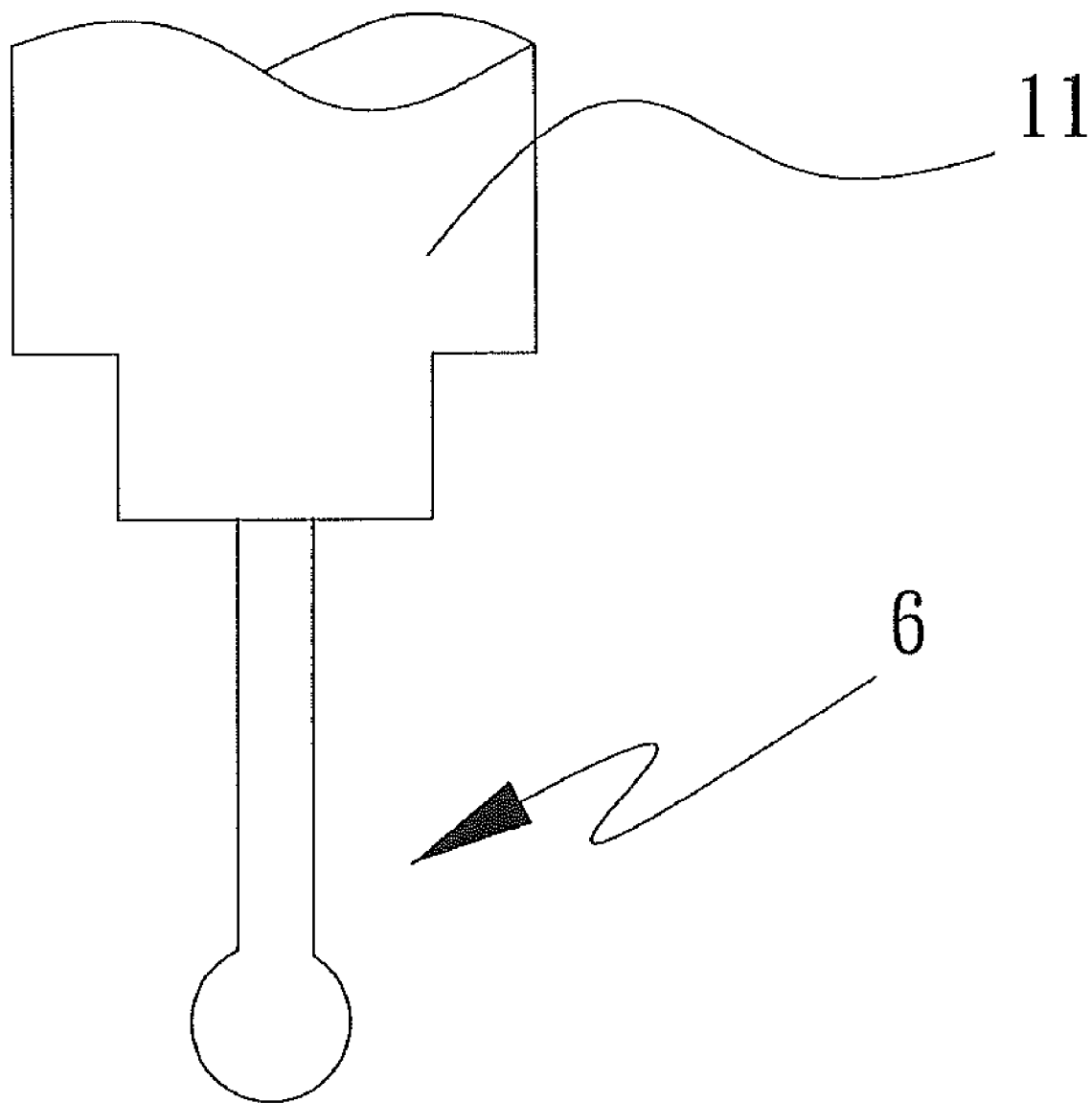
FIG. 5B is a schematic view of a micro spherical stylus once the micro electrode tool is combined with the micro sphere.
Figure 7:
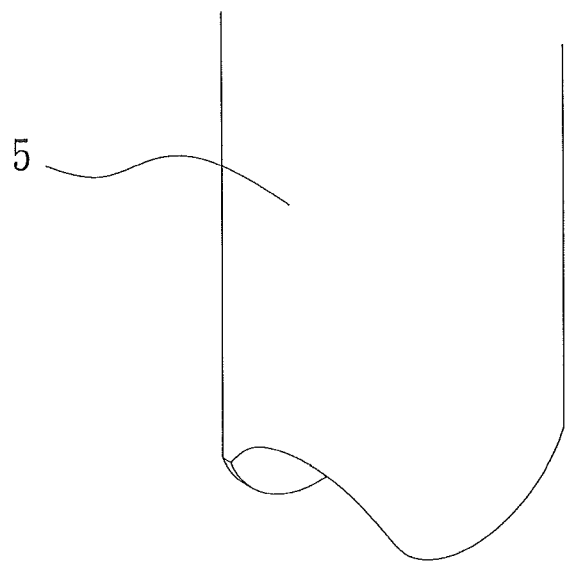
FIG. 7 is a schematic view of a front end of the micro electrode tool that is discharging machined into an arc-shaped end.

With reference to FIGS. 3 to 5 for schematic views of an arc manufacturing at a front end of a micro electrode tool, a micro electrode tool before and after it is combined with a micro sphere in accordance with a preferred embodiment of the present invention respectively together with FIGS. 1 and 2, the clamp 11 is used for clamping a circular-shaped electrode 2, and the moving unit 10 is coupled with the clamp 11 and the loading unit 17 so that the clamp 11 can be moved downward or upward in according to the discharge machining process. The circular-shaped electrode 2 is firstly passed through the upper insulating guide plate 1411, and the transistor resistor capacitor discharging unit 161 is used for performing a rough discharge machining to the circular-shaped electrode 2. Once the rough discharge machining operation is done, the circular-shaped electrode 2 is then passed through the lower insulating guide plate 1412, and the resistor capacitor discharging unit 162 is used for performing an operation of fine-tune (finishing) discharge machining to the circular-shaped electrode 2. Finally, selecting one of the two resistor capacitor discharging units 161 or 162 for performing discharge machining to the circular-shaped electrode 2 in such that the circular-shaped electrode 2 is machined into a micro electrode tool 5 with the arc-shaped front end as shown in FIG. 4B after the finishing discharge machining operation. As a result, the front portion of the circular shaped electrode 2 is machined into an arc-shaped structure shown in FIGS. 4B & 7. FIG. 4B, once the front portion of the micro electrode tool 5 is machined into the arc-shaped end by the discharge machining operations via the two insulating guide plates 1411 & 1412, the inner part of the arc-shaped end of the micro electrode tool 5 is then glued with an adhesive 4.

The arc-shaped end of micro electrode tool 5 is aligned in respect of the loading unit 17. When the arc-shaped end micro electrode 5 is very close to the loading unit 17, an electrical connection will occur in such the arc-shaped end of micro electrode tool 5 can control and adjust its distance and position itself either left or right in referring to the loading unit 17. The central point of the gap between the loading unit 17 and the arc-shaped end micro electrode tool 5 is the central line of the loading unit 17 so that the discharging unit can move the arc-shaped end of micro electrode tool 5 in respect with the loading unit 17. After alignment, the arc-shaped end micro electrode tool 5 is moved in respect of the loading unit 17 in such that the gap between the arc-shaped front end of the micro electrode tool 5 and the micro sphere 3 on the loading unit 17 is approximately 1-2 μm. The micro sphere 3 is attached to the carrying opening 171 by utilizing the air flow guide unit 173 to vacuum out the air within the air passage 172. The micro sphere 3 is fixedly sucked onto the carrying opening 171 due to the vacuum inside the air passage 172. The arc-shaped of micro electrode tool 5 is moved in accordance with the precise position function of the discharging unit to precisely towards the micro sphere 3. Simultaneously, the clamp 11 and the arc-shaped end of micro electrode tool 5 are being moved downward by the moving unit 10. The air flow guide unit 173 of the loading unit 17 blows air into the air passage 172 to push the micro sphere 3 moving towards the arc-shaped end of the micro electrode tool 5. The blowing force of the air flow guide unit 173 to move the micro sphere 3 is about 1.4~1.6 times of the weight of the micro sphere 3, preferably 1.5 times to the weight of the micro sphere 3. When the air flow guide unit 173 blows air to push the micro sphere 3 towards the inner part of the arc-shaped end of the micro electrode tool 5, the micro sphere 3 will be adhered onto the inner part of the arch-shaped end because of the adhesive 4, once the micro sphere 3 is adhered onto the arc-shaped end micro electrode tool 5, a micro spherical stylus 6 is formed as shown in FIG. 5.

The rough and finish electro discharging machining operations are determined by the level of the discharge energy in discharge unit 16 to determine how rough or fine the micro electrode tool 5 would be discharging machined. In other words, the rough or the finish discharging machining is determined by the transistor resistor capacitor discharging unit 161 and the resistor capacitor discharging unit 162, respectively. The diameter of the conducting wire body 15 of the discharging unit is approximately 100 μm. The micro sphere 3 is adhered onto the inner part of the arc-shaped end of the micro electrode tool 5 as shown in FIG. 5, and since the end of the micro electrode tool 5 is an arc shape, the micro sphere 3 is attached to the arc shape end of the micro electrode tool 5 by adhering to the adhesive surface of the micro electrode tool 5. In other words, according to the technique utilized in the present invention, the micro electrode tool 5 can adhere a bigger size of micro sphere as the micro sphere 3 can be located fixedly onto the micro electrode tool 5. For example, if the diameter of the micro electrode tool 5 is about 70 μm, a diameter of 100 μm of micro sphere 3 can be adhered in accordance with another preferred embodiment of the present invention. However, the design of the present invention is not limited to the size or the diameter of the micro sphere 3 or micro electrode tool 5 used in the embodiments, other sizes or diameter can be employed.

Instead of EDM machining the surface contour of the metal rod to form the circular-shaped electrode and the micro sphere, the present invention provides a simple and easy way to manufacture the micro spherical stylus. The fabrication method of the present invention comprises two main steps to manufacture the micro spherical stylus, which unlike most of prior art. Firstly, the circular-shaped electrode is machined into a micro electrode tool 5 via the rough and finishing discharge machining operations. Secondly, a suitable size of micro sphere 3 is selected and adhered precisely onto the arc-shaped front end of the micro electrode tool 5 via the carrying opening 171 of the loading unit 17 to form the micro spherical stylus 6.

With the micro spherical stylus manufacturing machine of the invention, a super micro electrode tool with a diameter ψ of 0.04 mm or below 0.02 mm cam be manufactured easily and quickly. In addition, the micro spherical stylus for a micro coordinate measuring machine can be glued and manufactured on the same manufacturing machine without causing the issue of a deviated, bent or broken stylus. Further the micro electrode tool 5 is designed to form the arc shape in its front end so that the micro sphere 3 can be adhered precisely and easily onto the front end of micro electrode tool 5 without any deviation problem. Since the micro sphere 3 can be selected easily, the present invention does not limited by the sizes of the micro sphere 3. Furthermore, since there is no machining operation on the micro sphere 3, therefore, no deviation or machining marks on the micro sphere 3.

There are several methods to align the position of the clamp 11 to the loading unit 17: by (1) moving both clamp 11 and loading unit 17 via the moving unit 10 to be in an alignment position with each other; or (2) moving the clamp 11 with respect to the position of the loading unit 17; or (3) moving the loading unit 17 with respect to the position of the clamp 11. The alignment of the clamp 11 and loading unit 17 is not restricted to the above-mentioned methods only, other methods can be employed to aligning the position of the clamp 11 in reference to the position of the loading unit 17. The best mode of the invention is to move and align the position of the clamp 11 in respect of the position of the loading unit 17.

In summation of the description above, the present invention uses the loading unit installed at the multi-step dual-winding micro electrode tool manufacturing machine to combine the micro sphere with the micro electrode tool, so as to achieve the effect of forming micro spherical styluses for micro coordinate measuring machines on the same platform, and also complies with patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A micro spherical stylus manufacturing machine, comprising:
   a clamp, installed at the micro spherical stylus manufacturing machine and capable of moving vertically up and down;
   a wire supply unit, pivotally installed at the micro spherical stylus manufacturing machine;
   a wire retrieving unit, pivotally installed at the micro spherical stylus manufacturing machine;
   an insulating roller, pivotally installed at the micro spherical stylus manufacturing machine, and having an insulating guide trench;
   a conducting wire body, wound around the wire supply unit, slid through the insulating guide trench, and then wound at the wire retrieving unit;
   a discharging unit, electrically coupled to the conducting wire body; and
   a loading unit, installed at the manufacturing machine, and capable of moving along a plane of the micro spherical stylus manufacturing machine, and the loading unit having a carrying opening, an air passage and an air flow guide unit, and the air passage being interconnected to the carrying opening and the air flow guide unit;
   wherein the wire supply unit comprises an upper wire supply unit and a lower wire supply unit, and the wire retrieving unit further comprises an upper wire retrieving unit and a lower wire retrieving unit, and the insulating roller is a multi-step insulating roller, and the insulating roller comprises an upper insulating guide plate and a lower insulating guide plate, and the upper insulating guide plate and the lower insulating guide plate constitute a multi-step form with each other, and the upper insulating guide plate is situated at a position away from the clamp,
   wherein the lower insulating guide plate is situated at a position proximate to the clamp, and the conducting wire body comprises an upper conducting wire body and a lower conducting wire body, and the upper conducting wire body is wound around the upper wire supply unit and slid through the upper insulating guide plate and then wound around the upper wire retrieving unit, and the lower conducting wire body is wound around the lower wire supply unit and slid through the lower insulating guide plate and then wound around the lower wire retrieving unit.

2. The micro spherical stylus manufacturing machine of claim 1, wherein the discharging unit comprises a transistor resistor capacitor discharging unit and a resistor capacitor discharging unit, and the transistor resistor capacitor discharging unit is electrically coupled to the upper conducting wire body, and the resistor capacitor discharging unit is electrically coupled to the lower conducting wire body.

3. The micro spherical stylus manufacturing machine of claim 2, further comprising a front support shaft pivotally installed at the manufacturing machine and situated between the wire supply unit and the multi-step insulating roller, and the upper conducting wire body sliding from the upper wire supply unit through the front support shaft, and then sliding through an upper insulating guide slot, and the lower conducting wire body sliding from the lower wire supply unit through the front support shaft and then sliding through a lower insulating guide slot.

4. The micro spherical stylus manufacturing machine of claim 3, further comprising a rear support shaft pivotally installed at the manufacturing machine and situated between the multi-step insulating roller and the wire retrieving unit, and the upper conducting wire body sliding from the upper insulating guide plate through the rear support shaft and then wound around the upper wire retrieving unit, and the lower conducting wire body sliding from the lower insulating guide plate through the rear support shaft and then wound around the lower wire retrieving unit.

5. A micro spherical stylus manufacturing machine, comprising:
- a clamp, installed at the micro spherical stylus manufacturing machine and capable of clamping a circular-shaped electrode to move vertically up and down;
- an EDM machine, installed at the micro spherical stylus manufacturing machine and capable of discharge machining to the circular-shaped electrode into a micro electrode tool; and
- a loading unit, installed at the micro spherical stylus manufacturing machine, wherein the loading unit comprises a carrying opening, an air passage and an air flow guide unit, and the air passage being interconnected to the carrying opening and the air flow guide unit;
- wherein a micro sphere can be attached to the carrying opening of the loading unit by utilizing the air flow guide unit to vacuum out the air inside the air passage so that the micro sphere is fixedly sucked onto the carrying opening and the micro sphere can be carried by the loading unit towards a front end of the micro electrode tool such that a micro spherical stylus is generated.

6. The micro spherical stylus manufacturing machine of claim 5, wherein the clamp is coupled to a moving unit and is capable of aligning to a central line of the loading unit and the micro electrode tool.

7. The micro spherical stylus manufacturing machine of claim 5, wherein a moving unit is coupled to the loading unit so that loading unit is aligned to a central line of the micro electrode tool and the loading unit.

8. The micro spherical stylus manufacturing machine of claim 5, wherein the EDM machine further comprises a transistor resistor capacitor discharging unit for a rough trim discharge machining, and a resistor capacitor discharging unit for a fine-tune discharge machining.

9. The micro spherical stylus manufacturing machine of claim 5, wherein blowing force of the air flow guide unit to move the micro sphere is about 1.4~1.6 times of the weight of the micro sphere.

10. The micro spherical stylus manufacturing machine of claim 5, wherein the EDM machine further comprises:
- a wire supply unit, pivotally installed at the EDM machine;
- a wire retrieving unit, pivotally installed at the EDM machine;
- an insulating roller, pivotally installed at the EDM machine, and having an insulating guide trench;
- a conducting wire body, wound around the wire supply unit, slid through the insulating guide trench, and then wound at the wire retrieving unit;
- a discharging unit, electrically coupled to the conducting wire body.

11. The micro spherical stylus manufacturing machine of claim 10, wherein the insulating roller further comprises a slot formed at one section of the insulating roller and the conducting wire body is slid across the slot.

12. The micro spherical stylus manufacturing machine of claim 10, wherein the wire supply unit comprises an upper wire supply unit and a lower wire supply unit, and the wire retrieving unit further comprises an upper wire retrieving unit and a lower wire retrieving unit, and the conducting wire body comprises an upper conducting wire body and a lower conducting wire body, and the discharging unit comprises a transistor resistor capacitor discharging unit and a resistor capacitor discharging unit for performing rough discharge machining and fine-tune discharge machining respectively.

* * * * *